United States Patent
Schneider et al.

(10) Patent No.: US 6,966,579 B2
(45) Date of Patent: Nov. 22, 2005

(54) EXTENSIBLE TETHERED AIRBAG SYSTEM

(75) Inventors: David W. Schneider, Waterford, MI (US); David L. Dominissini, Allen Park, MI (US)

(73) Assignee: Autoliv ASP, Inc., Ogden, UT (US)

( * ) Notice: Subject to any disclaimer, the term of this patent is extended or adjusted under 35 U.S.C. 154(b) by 276 days.

(21) Appl. No.: 10/396,613

(22) Filed: Mar. 25, 2003

(65) Prior Publication Data

US 2004/0188991 A1  Sep. 30, 2004

(51) Int. Cl.⁷ .................. B60R 21/22; B60R 21/16
(52) U.S. Cl. ............... 280/743.2; 280/730.1; 280/730.2; 280/728.2; 280/743.1
(58) Field of Search ............ 280/743.2, 730.1, 280/730.2, 728.2, 743.1

(56) References Cited

U.S. PATENT DOCUMENTS

| | | | | |
|---|---|---|---|---|
| 3,897,961 A | * | 8/1975 | Leising et al. ........... | 280/730.1 |
| 3,930,667 A | * | 1/1976 | Osuchowski et al. ..... | 280/730.1 |
| 4,059,852 A | * | 11/1977 | Crane ........................ | 2/456 |
| 4,536,008 A | * | 8/1985 | Brown, Jr. ............... | 280/730.1 |
| 4,825,469 A | * | 5/1989 | Kincheloe ................ | 2/456 |
| 5,282,646 A | * | 2/1994 | Melvin et al. ............. | 280/729 |
| 5,362,101 A | * | 11/1994 | Sugiura et al. ............ | 280/743.2 |
| 5,489,119 A | * | 2/1996 | Prescaro et al. .......... | 280/743.2 |
| 5,570,905 A | | 11/1996 | Dyer | |
| 5,602,734 A | * | 2/1997 | Kithil ........................ | 701/45 |
| 5,678,858 A | * | 10/1997 | Nakayama et al. ........ | 280/743.2 |
| 5,813,696 A | * | 9/1998 | Hill .......................... | 280/743.2 |
| 5,845,935 A | * | 12/1998 | Enders et al. ............. | 280/743.2 |
| 5,997,037 A | * | 12/1999 | Hill et al. ................. | 280/743.2 |
| 6,045,154 A | | 4/2000 | Walton et al. | |
| 6,113,141 A | | 9/2000 | Baker | |
| 6,276,716 B1 | * | 8/2001 | Kato ......................... | 280/735 |
| 6,283,498 B1 | * | 9/2001 | Breitweg .................. | 280/728.3 |
| 6,422,597 B1 | * | 7/2002 | Pinsenschaum et al. ... | 280/735 |
| 6,431,583 B1 | | 8/2002 | Schneider | |
| 6,464,255 B1 | | 10/2002 | Preisler et al. | |
| 6,669,229 B2 | * | 12/2003 | Thomas ..................... | 280/732 |
| 6,709,008 B2 | * | 3/2004 | McGee et al. ............. | 280/729 |
| 6,722,691 B1 | * | 4/2004 | Håland et al. ............ | 280/730.1 |

FOREIGN PATENT DOCUMENTS

| | | |
|---|---|---|
| DE | 36 18 060 | * 12/1987 |
| GB | 2345669 | 7/2000 |
| JP | 9-328048 | * 12/1999 |
| WO | 00/41919 | 7/2000 |

* cited by examiner

Primary Examiner—Paul N. Dickson
Assistant Examiner—George D. Spisich
(74) Attorney, Agent, or Firm—Sally J. Brown

(57) ABSTRACT

The tethered airbag system includes an inflatable cushion and an extensible tether. The extensible tether includes an extensible region and is attached to both the inflatable cushion and to a point within a vehicle. For instance, the tether may be attached to the roof of the vehicle. When in use, the inflatable cushion deploys to a location immediately in front of an occupant of the vehicle. Following deployment of the cushion, when a sufficient force is applied to the inflatable cushion, the extensible region is released so that the extensible tether may extend to its full length and the inflatable cushion may extend further away from the point where the tether is attached to the vehicle.

31 Claims, 6 Drawing Sheets

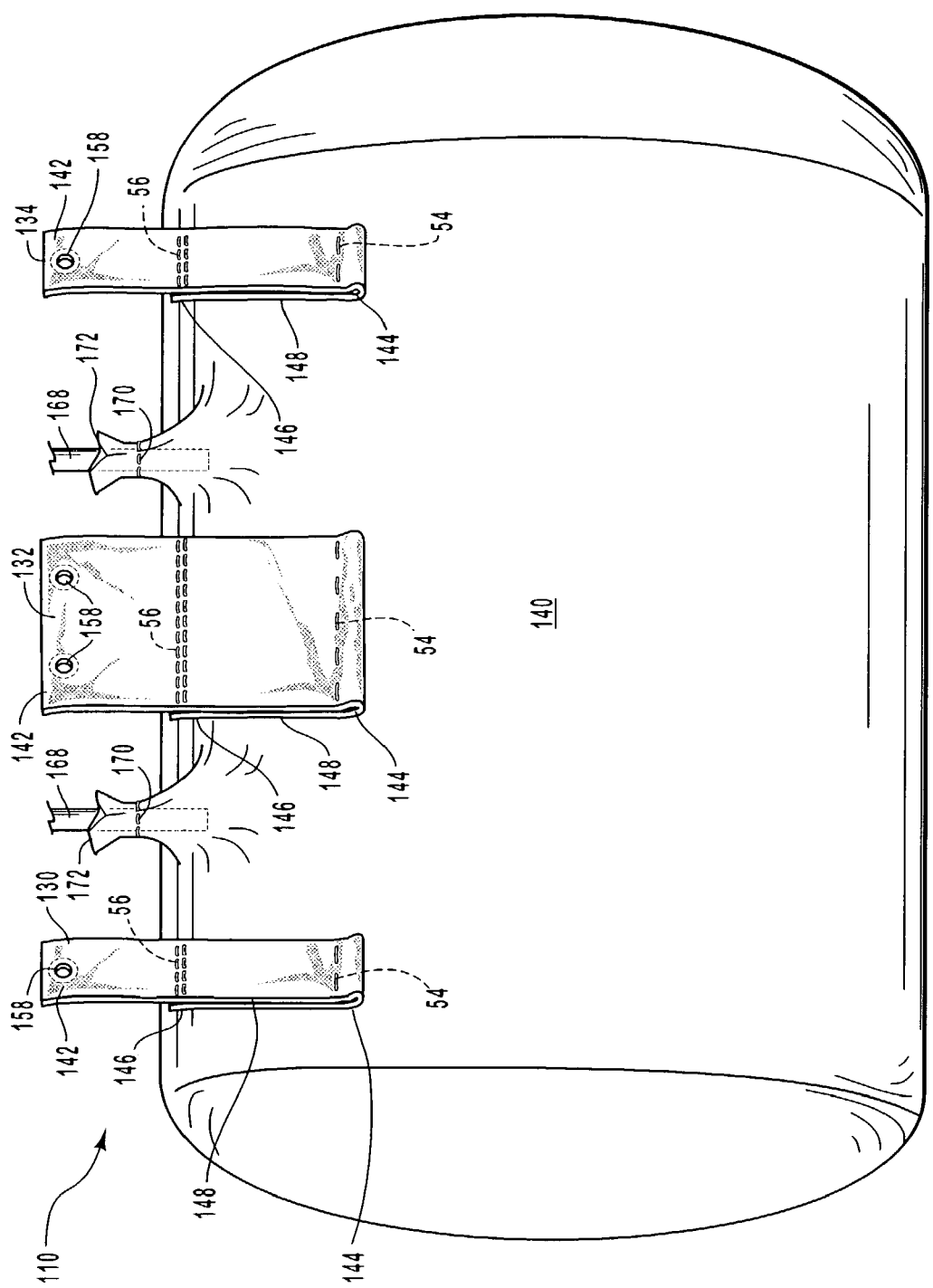

US 6,966,579 B2

EXTENSIBLE TETHERED AIRBAG SYSTEM

BACKGROUND OF THE INVENTION

1. Field of the Invention

The present invention relates to an airbag system designed to protect the occupants of a vehicle during a collision. More specifically, the invention relates to an airbag system including an extensible tether.

2. Description of Related Art

Inflatable airbags are well accepted for use in motor vehicles and have been credited with preventing numerous deaths and injuries. Some statistics estimate that frontal airbags reduce the fatalities in head-on collisions by 25% among drivers using seat belts and by more than 30% among unbelted drivers. Statistics further suggest that with a combination of a seat belt and an airbag, serious chest injuries in frontal collisions can be reduced by 65% and serious head injuries by up to 75%. Airbag use presents clear benefits, and vehicle owners are frequently willing to pay the added expense for airbags.

Furthermore, the inclusion of inflatable safety restraint devices, or airbags, is now a legal requirement for many new vehicles. Airbags are typically installed in the steering wheel and in the instrument panel on the passenger side of a car. In the event of an accident, an accelerometer within the vehicle measures the abnormal deceleration and triggers the ignition of a charge. Expanding gases from the charge fill the airbags, which immediately inflate in front of the driver and passenger to protect them from impact against the windshield or instrument panel.

Airbag apparatuses have been primarily designed for deployment in front of an occupant's torso, between the torso and the instrument panel. Conventional airbags, such as driver's side or passenger's side airbags protect the occupant's upper torso and head from colliding with a windshield or instrument panel. Such conventional airbag modules for frontal occupant protection deploy from the instrument panel or the steering wheel. This location has several disadvantages, including poor protection for out-of-position (OOP) occupants and unaesthetic tear seams on the instrument panel or steering wheel.

Overhead airbags have been produced in an attempt to provide better protection for out-of-position vehicle occupants and to avoid the necessity of installing airbags in the vehicle instrument panel. Unfortunately, known overhead airbags also have a number of disadvantages. For instance, many overhead bags include high-pressure filling tubes that are attached at one end to an inflator and at the opposite end to the cushion. Folding these filling tubes introduces complexity into the manufacturing and assembly process, increasing the cost of these systems. Moreover, the tubes consume large amounts of valuable space when the airbag system is in a stowed position. The tubes also make the installation process difficult or require modifications to a vehicle to enable installation.

Another type of overhead airbag completely detaches from the roof of the vehicle following inflation. This is done to prevent more rapid deceleration of the occupant's head relative to his body, minimizing the danger of neck or back injury. Unfortunately, because the airbag completely separates from the vehicle, it may be difficult to establish, after an accident, that the airbag properly deployed. Furthermore, in such an embodiment, because the airbag completely detaches from the vehicle following inflation, it may be difficult to ensure proper positioning of the airbag, particularly when angular or lateral forces affect the airbag.

Consequently, it would be an advancement in the art to provide an overhead airbag system that does not require lengthy filling tubes and yet remains attached to the vehicle following deployment. It would be a further advancement in the art if such an airbag could extend away from the roof of the vehicle following inflation such that no unnecessary stress is placed on an occupant's neck. Such a device is disclosed and claimed herein.

SUMMARY OF THE INVENTION

The apparatus and method of the present invention have been developed in response to the present state of the art, and in particular, in response to problems and needs in the art that have not yet been fully solved by currently available airbag systems. More specifically, the disclosed airbag system deploys an inflatable cushion from the roof of a vehicle to an area immediately in front of an occupant. When the occupant strikes the inflatable cushion, an extensible tether permits the cushion to extend further away from the roof of the vehicle to minimize the risk of injury to the neck and back of the protected occupant.

The tethered airbag system includes an inflatable cushion and at least one extensible tether. Moving from one end of the extensible tether to the other, the extensible tether includes a secure attachment region, an extensible region, a frangible attachment region, and a vehicle attachment region.

A secure attachment mechanism secures the secure attachment region of the extensible tether to the inflatable cushion. The secure attachment mechanism maintains the connection between the inflatable cushion and the secure attachment region of the extensible tether during all stages of deployment. The secure attachment mechanism may include a variety of mechanical fasteners, such as stitching, adhesives, a rivet, a clip, a pin, a staple, or a ring.

A frangible attachment mechanism secures the frangible attachment region of the extensible tether to the inflatable cushion such that the extensible region, which is positioned between the frangible attachment region and the secure attachment region, is positioned in close proximity to the inflatable cushion. The frangible attachment mechanism is designed to break when subjected to a predetermined amount of force and may include a variety of mechanical fasteners.

The vehicle attachment region may include one or more openings for attaching the extensible tether to a vehicle using, for instance, a bolt or a rivet. Various other types of mechanical fasteners, such as adhesives, pins, or rings may be used to secure the extensible tether to a vehicle.

One or more filling ducts are positioned within apertures in the inflatable cushion. The filling ducts are in fluid communication with an inflator. As such, inflation gas moves from the inflator, through the filling ducts, and into the inflatable cushion. The filling ducts may be made from either a rigid material, such as a plastic, or a flexible material, such as a fabric.

The filling ducts are designed to separate from the inflatable cushion after the cushion is inflated. This may be achieved in a number of different ways. For instance, a clamp may secure a filling duct within an aperture in the inflatable cushion. A frangible seam may surround the portion of the inflatable cushion clamped to the filling duct. Upon the application of a predetermined force, the frangible seam breaks, enabling the filling duct to separate from the inflatable cushion. In the alternative, frangible stitching, or another type of frangible mechanical fastener, may secure the filling duct within an aperture of the inflatable cushion. The frangible stitching breaks upon the application of a predetermined force, again permitting the filling duct to separate from the inflator. In yet another embodiment, following inflation of the inflatable cushion, the filling duct separates from the inflator and remains attached to the inflatable cushion. This may be achieved using, for example, a frangible gas guide, frangible filling duct, or frangible connector.

In accordance with the physical description provided above, the tethered airbag system functions in the following way. The tethered airbag can be stored in a storage compartment in a roof of a vehicle. When accident conditions are detected, a signal is sent to activate the inflator. The injection of inflation gas into the inflatable cushion propels the inflatable cushion out of its storage compartment to a position immediately in front of a protected occupant. The extensible tether restricts the movement of the inflatable cushion. The frangible attachment mechanism or mechanisms do not break at this stage so that the extensible region is maintained proximate the inflatable cushion.

Thereafter, the force of the cushion moving away from the storage compartment and/or the force of the occupant striking the cushion breaks the frangible attachment mechanism or mechanisms, permitting the extensible region to move away from the inflatable cushion so that the extensible tether may extend to its full length. The filling ducts also separate from the inflatable cushion as the extensible tether extends to its full length. Accordingly, the inflatable cushion may move a greater distance away from the roof of the vehicle. As such, the head and neck of the occupant do not decelerate substantially more rapidly than the occupant's body, minimizing the danger of neck or back injury. In addition, the secure attachment mechanism maintains the attachment between the secure attachment region of the extensible tether and the inflatable cushion during all stages of deployment. This secure attachment helps to maintain the inflatable cushion in front of the occupant even when the vehicle is subjected to lateral or angular forces.

The tethered airbag system may be embodied in a number of different ways within the scope of this invention. For example, the tethered airbag system may include multiple extensible tethers at various positions on an inflatable cushion. Likewise, the number of filling ducts is not limiting of the scope of the invention.

In addition, a single extensible tether may include, moving away from the center of the tether, two opposing secure attachment regions, two opposing extensible regions, two opposing frangible attachment regions and two opposing vehicle attachment regions. The center of the extensible tether is positioned over the proximal end, or top, of the cushion. Each secure attachment region and frangible attachment region attaches to opposing sides of the inflatable cushion. Each vehicle attachment region is attached to the vehicle. During deployment, the opposing frangible attachment regions separate from the inflatable cushion at approximately the same time to release the opposing extensible regions so that the extensible tether can extend to its full length.

In addition, the extensible tethers and filling ducts may be positioned on the same or adjacent sides of the inflatable cushion. The tethered airbag system may also be used to protect occupants in the back seat of a vehicle. In addition to deploying from the roof of a vehicle, the tethered airbag system may deploy from other locations within the vehicle, such as the door.

In view of the foregoing, the tethered airbag system provides substantial advantages over conventional systems. The tethered airbag system deploys the inflatable cushion in a position immediately in front of a protected occupant. Thereafter, the frangible attachment mechanisms break to permit the inflatable cushion to shift further toward the front of the vehicle, minimizing the risk of neck or back injury to a protected occupant. Through all stages of deployment, the secure attachment mechanisms retain the inflatable cushion securely attached to the extensible tether or tethers.

These and other features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a more particular description of the invention summarized above will be rendered by reference to the appended drawings. Understanding that these drawings illustrate only selected embodiments of the invention and are not therefore to be considered limiting in scope, the invention will be described and explained with additional specificity and detail through the use of the accompanying drawings in which:

FIG. 6 is a perspective view of an alternative embodiment of a tethered airbag system.

DETAILED DESCRIPTION OF THE PREFERRED EMBODIMENTS

The preferred embodiments of the invention are now described with reference to FIGS. 1–6, wherein like parts are designated by like numerals throughout. The members of the present invention, as generally described and illustrated in the Figures, may be constructed in a wide variety of configurations. Thus, the following more detailed description of the embodiments of the system and method of the present invention, as represented in the Figures, is not intended to limit the scope of the invention, as claimed, but is merely representative of presently preferred embodiments of the invention.

In this application, the phrases "connected to," "coupled to," and "in communication with" refer to any form of interaction between two or more entities, including mechanical, electrical, magnetic, electromagnetic, and thermal interaction. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "directly attached to" refers to a form of attachment by which the attached items are either in direct contact, or are only separated by a single fastener, adhesive, or other attachment mechanism. The term "abutting" refers to items that are in direct physical contact with each other, although the items may not be attached together.

Figure 1:
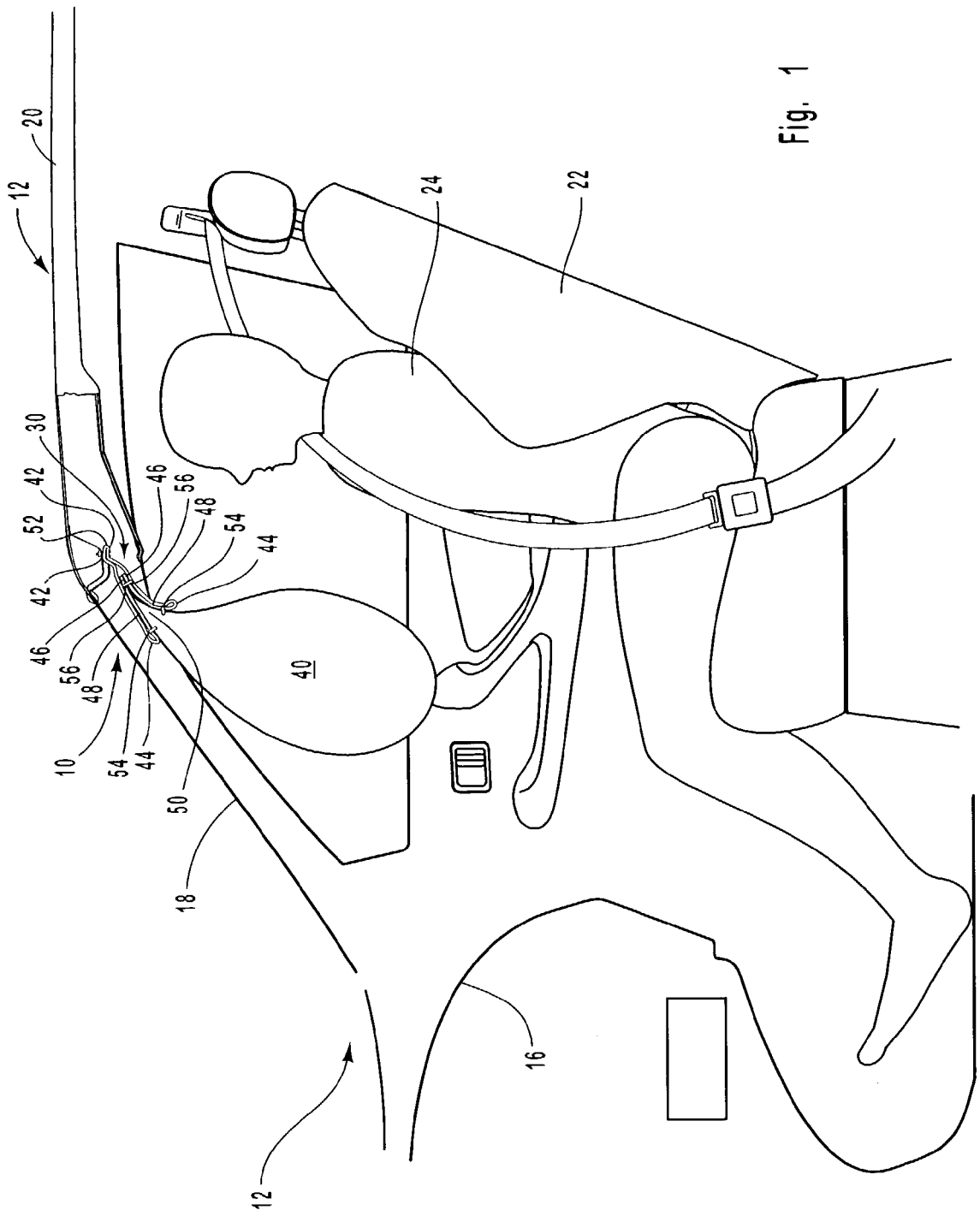
FIG. 1 is a side view of a first deployment stage of a tethered airbag system shown in a vehicle.

With reference to FIG. 1, there is illustrated a side view of a first deployment stage of a tethered airbag system 10. The tethered airbag system 10 is shown in a vehicle 12. The illustrated vehicle 12 includes a dashboard 16, windshield 18, roof 20, and seat 22. An occupant 24 of the vehicle 12 is also depicted. The depicted occupant 24 is seated in the passenger side of the vehicle 12. Of course, the tethered airbag system 10 can also be used to protect other occupants in the vehicle 12, such as the driver or occupants seated in the backseat (not shown) of a vehicle 12.

In FIG. 1, the tethered airbag system 10 is shown in a roof-mounted configuration. The tethered airbag system 10 can be mounted to other portions of the vehicle 12, such as a door (not shown).

The tethered airbag system 10 includes an extensible tether 30 and an inflatable cushion 40. The extensible tether 30 has a vehicle attachment region 42, a frangible attachment region 44, a secure attachment region 46, and an extensible region 48. The extensible region 48 is positioned between the secure attachment region 46 and the frangible attachment region 44. The frangible attachment region 44 is positioned between the secure attachment region 46 and the vehicle attachment region 42.

The vehicle attachment region 42 of the extensible tether 30 is secured to the vehicle 12, as will be discussed in further detail in connection with FIGS. 4 and 5. The frangible attachment region 44 and the secure attachment region 46 of the extensible tether 30 are attached to the inflatable cushion 40.

As illustrated, the extensible tether 30 may be fabricated from a strong, flexible material, such as fabric. The depicted extensible tether 30 traverses the proximal end 50 of the inflatable cushion 40 and is attached to opposing sides of the cushion 40. More specifically, the illustrated extensible tether 30 includes, moving away from the center 52 of the extensible tether 30, two opposing vehicle attachment regions 42, two opposing frangible attachment regions 44, two opposing extensible regions 48, and two opposing secure attachment regions 46. Each of the frangible attachment regions 44 and secure attachment regions 46 are attached to opposing sides of the inflatable cushion 40. Each of the vehicle attachment regions 42 are secured to the vehicle 12.

Attaching the extensible tether 30 to opposing sides of the inflatable cushion 40 provides additional stability to the cushion 40 during deployment. However, in an alternative embodiment of this invention (not illustrated), the extensible tether 30 attaches to a single side of the inflatable cushion 40 and, accordingly, includes only a single secure attachment region 46, a single extensible region 48, a single frangible attachment region 44, and a single vehicle attachment region 42. In yet another alternative embodiment (not illustrated), one or more separate and distinct extensible tethers 30 may be attached to opposing sides of the inflatable cushion 40.

A frangible attachment mechanism 54 attaches each frangible attachment region 44 to the inflatable cushion 40. Each frangible attachment mechanism 54 is designed to break when a predetermined force is applied. The frangible attachment mechanism 54 may include a variety of mechanical fasteners, such as frangible stitching 54 (illustrated in FIG. 1), adhesives, a clip, a pin, a staple, or a ring. When the frangible attachment mechanism 54 breaks, the frangible attachment regions 44 and the adjacent extensible regions 48 may separate from the inflatable cushion 40.

A secure attachment mechanism 56 attaches each secure attachment region 46 to the inflatable cushion 40. Unlike the frangible attachment mechanisms 54, the secure attachment mechanisms 56 are designed to maintain the attachment between the inflatable cushion 40 and the secure attachment region 46 during all stages of deployment of the tethered airbag system 10. The secure attachment mechanism 56 may include a variety of mechanical fasteners, such as secure stitching 56 (shown in FIG. 1), adhesives, a rivet, a clip, a pin, a staple, or a ring.

In the embodiment illustrated in FIG. 1, an extensible region 48 is positioned between the frangible attachment region 44 and the secure attachment region 46 on opposing sides of the extensible tether 30. A combination of the frangible attachment mechanism 54 and secure attachment mechanism 56 adjacent to each extensible region 48 retain each extensible region 48 in a position that is generally proximate the inflatable cushion 40. The operation of the extensible regions 48 when the frangible attachment mechanisms 54 break will be explained in greater detail in connection with FIGS. 2–3.

As stated above, in FIG. 1, the tethered airbag system 10 is shown in a first stage of deployment. Prior to this stage, the inflatable cushion 40 and extensible tether 30 were folded and stowed in the roof 20 of the vehicle 12. When accident conditions are detected, a coupled inflator (not shown) injects gas into the inflatable cushion 40. The injected gas expands the inflatable cushion 40 and propels the cushion 40 away from the roof 20 of the vehicle 12. Items used to inflate the cushion 40 (e.g., inflators, gas guides, and filling ducts) have been omitted from FIG. 1 for clarity, but will be described in connection with FIG. 5.

In the deployment stage shown in FIG. 1, the expansive force of the injected gas has propelled the inflatable cushion 40 to an area immediately in front of the occupant 24. Again, the frangible attachment mechanisms 54 have not yet broken and retain the extensible regions 48 in close proximity to the inflatable cushion 40.

Figure 2:
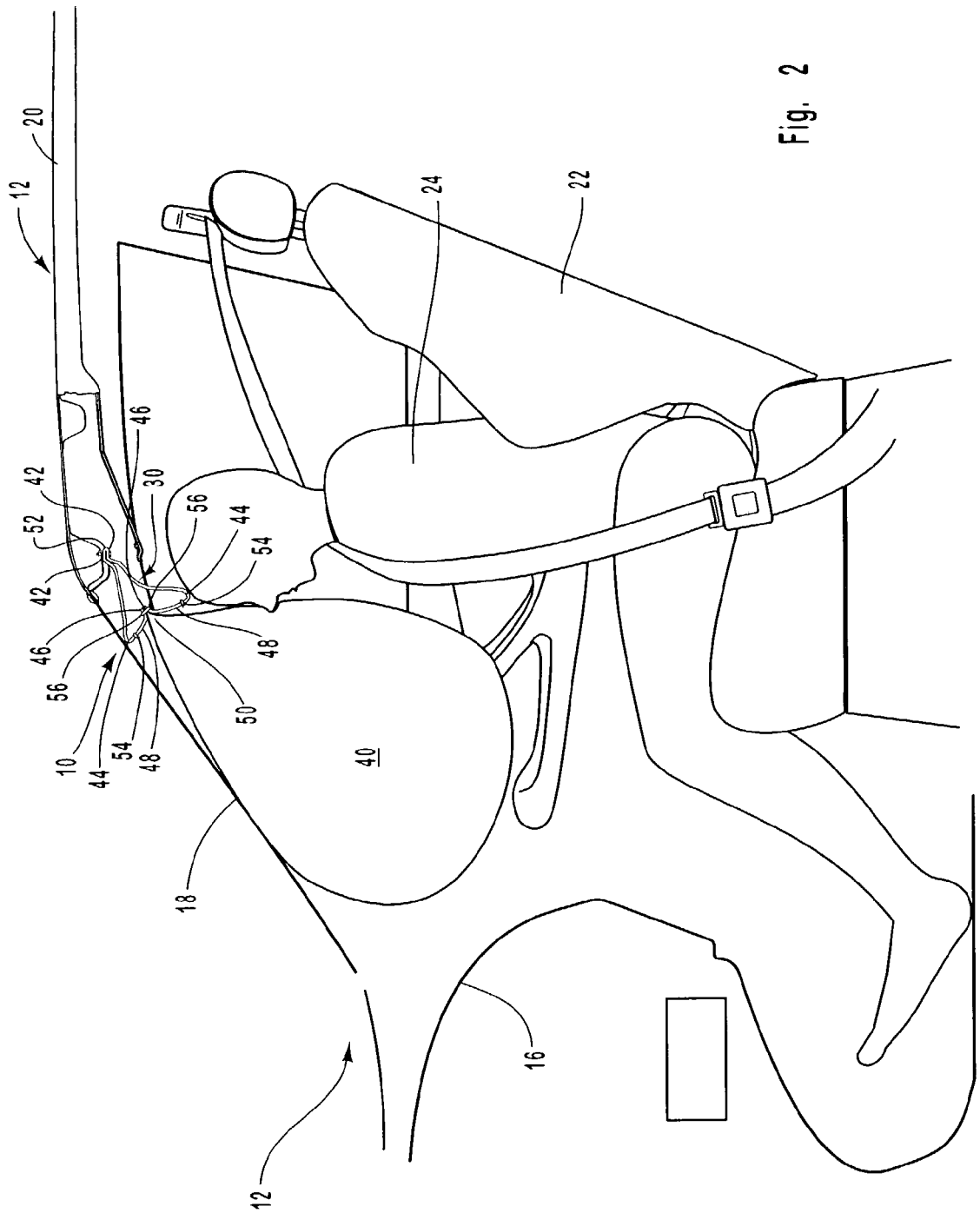
FIG. 2 is a side view of a second deployment stage of a tethered airbag system shown in a vehicle.

FIG. 2 is a side view of a second deployment stage of a tethered airbag system 10 shown in a vehicle 12. The deployment stage shown in FIG. 2 is subsequent in time to the deployment stage shown in FIG. 1. As with FIG. 1, inflators, gas guides, and filling ducts have been omitted from FIG. 2 for clarity. The vehicle 12 again includes a dashboard 16, windshield 18, roof 20, and seat 22. The depicted occupant 24 is seated in the passenger side of the vehicle 12. The extensible tether 30 and inflatable cushion 40 are also shown.

In the depicted stage, as a result of the vehicle 12 impacting an object, the vehicle 12 is decelerating more rapidly than the occupant 24. Accordingly, the occupant 24 has been thrust toward the dashboard 16 and has impacted the inflatable cushion 40, pushing the cushion 40 toward the dashboard 16. As a further consequence, additional force has been applied to the extensible tether 30, sufficient to break the frangible attachment mechanisms 54 and separate the frangible attachment regions 44 from the inflatable cushion 40. The extensible regions 48 may then rotate and extend in a direction away from the inflatable cushion 40. As such, the extensible tether 30 permits the inflatable cushion 40 to extend further away from the roof 20 than was previously permitted. The secure attachment mechanisms 56 remain in place and continue to secure the extensible tether 30 to the inflatable cushion 40, limiting the range of motion of the cushion 40.

The design and configuration of the frangible attachment mechanisms 54 may be varied to alter the predetermined force required to break these mechanisms 54. For instance, in an alternative embodiment, the frangible attachment mechanisms 54 may be designed to break at a low predetermined force such that the force of the inflatable cushion 40 moving away from the roof 20 may be sufficient to break these mechanisms 54.

Figure 3:
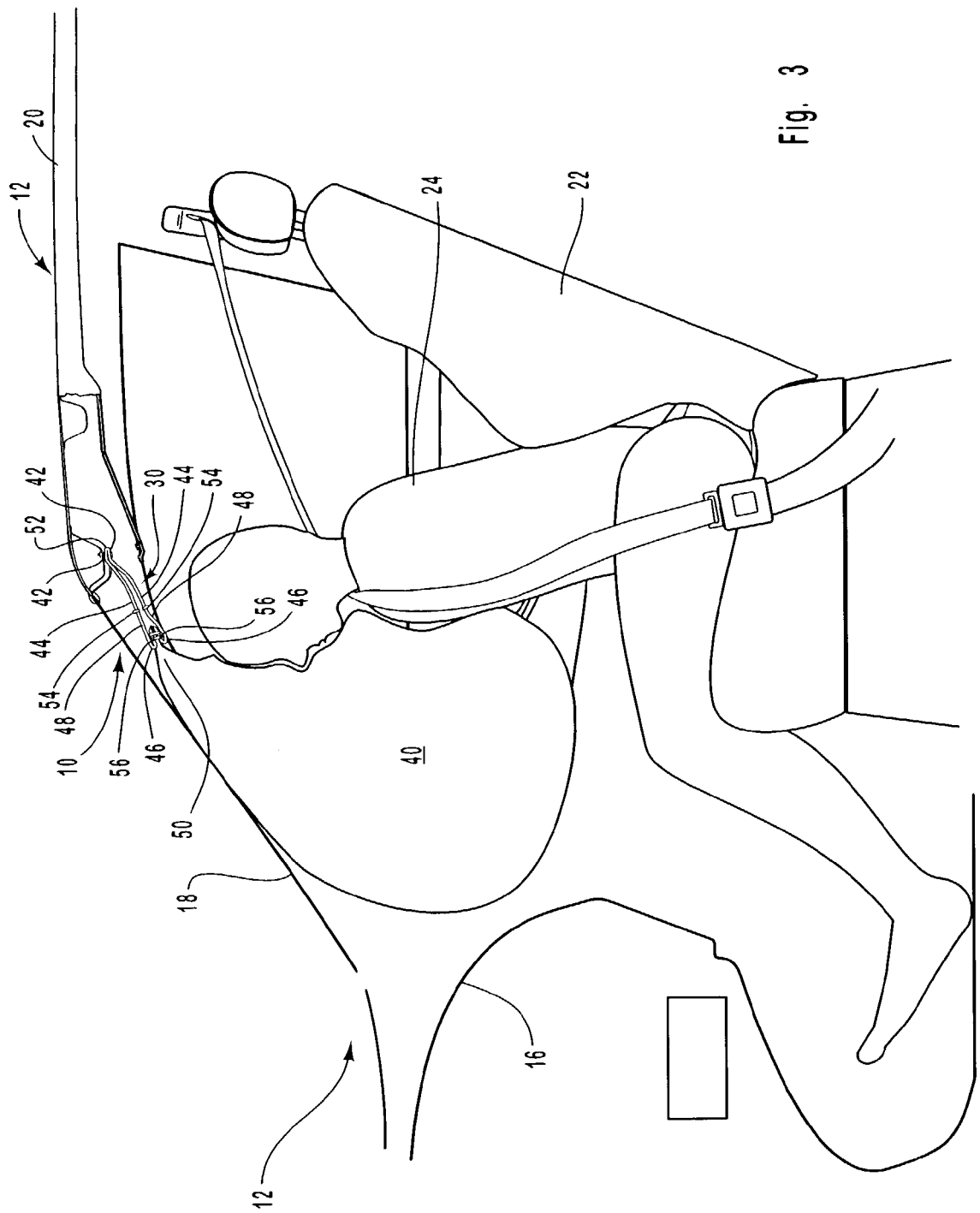
FIG. 3 is a side view of a third deployment stage of a tethered airbag system shown in a vehicle.

Referring to FIG. 3, there is shown is a side view of a third deployment stage of a tethered airbag system 10 in a vehicle 12. The inflatable cushion 40 and extensible tether 30 are also depicted. The third deployment stage is subsequent in time to the second deployment stage of FIG. 2. Inflators, gas guides, and filling ducts have been omitted from FIG. 3 for clarity.

In FIG. 3, the occupant 24 has more deeply impacted the inflatable cushion 40, and the cushion 40 has been pushed further toward the dashboard 16. As a result the extensible tether 30 is fully extended. The frangible attachment regions 44 are closer to each other, and the extensible regions 48 have rotated further away from the inflatable cushion 40.

The tethered airbag system 10 thus provides substantial advantages over conventional airbag systems. During deployment, but prior to breaking the frangible attachment mechanisms 54, the inflatable cushion 40 is properly positioned immediately in front of the occupant 24, such that the cushion 40 can safely receive and decelerate the occupant 24. After the occupant 24 impacts the cushion 40, the frangible attachment mechanisms 54 break, enabling the extensible tether 30 to fully extend. Accordingly, the occupant's head will not decelerate more rapidly than his body, minimizing the risk of neck or back injury.

The secure attachment mechanisms 56 maintain the attachment between the inflatable cushion 40 and secure attachment regions 46 during all stages of deployment. As a result, the secure attachment mechanisms 56 help to maintain the inflatable cushion 40 in front of the occupant 24, even when the vehicle 12 is subjected to lateral or angular forces.

Figure 4:
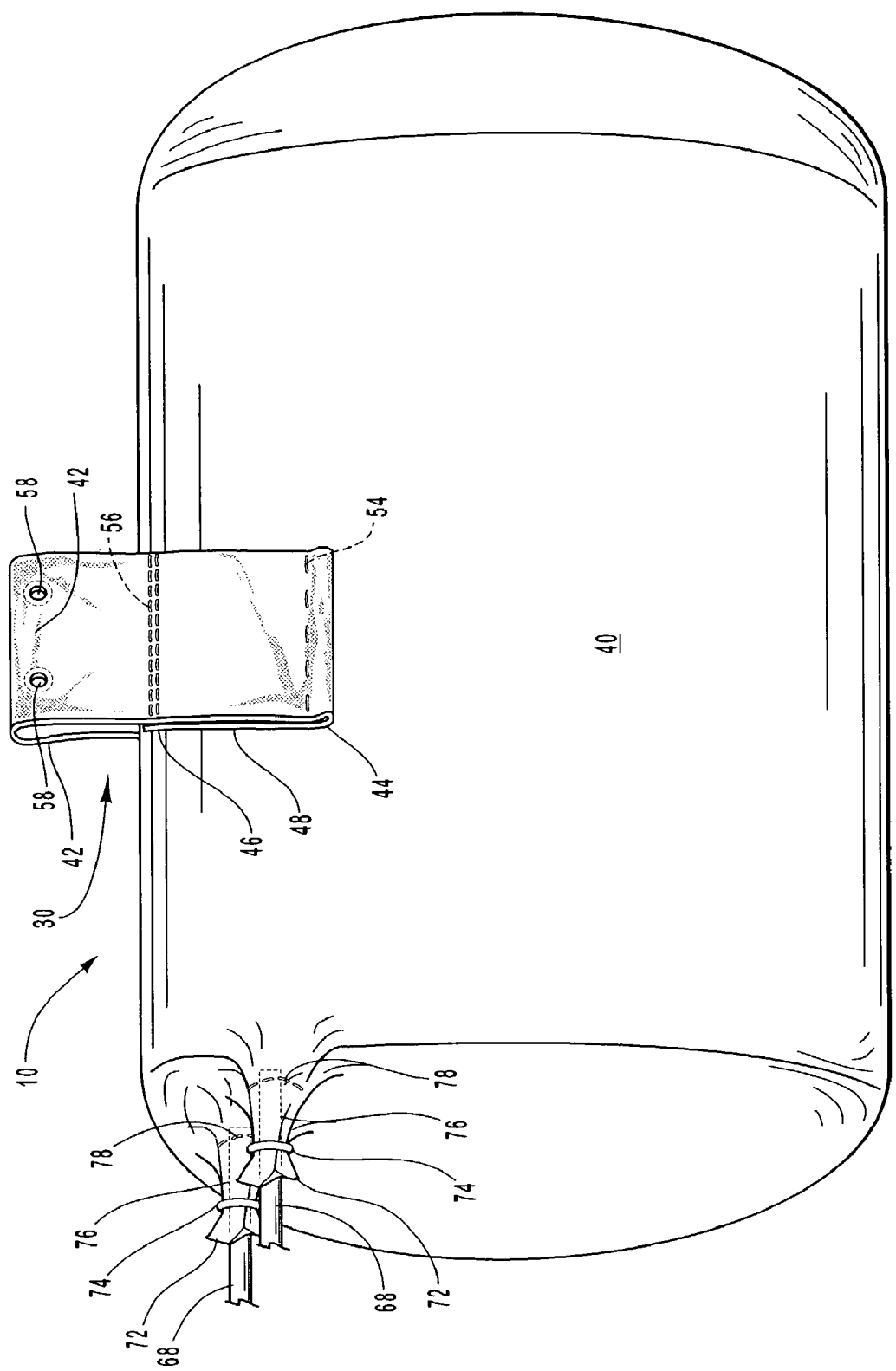
FIG. 4 is a perspective view of a tethered airbag system.

FIG. 4 is a perspective view of a tethered airbag system 10. The illustrated system 10 includes an extensible tether 30, an inflatable cushion 40, and two filling ducts 68.

The extensible tether 30 has a vehicle attachment region 42, a frangible attachment region 44, an extensible region 48, and a secure attachment region 46. Openings 58 in the vehicle attachment region 42 enable secure attachment of the extensible tether 30 to the vehicle 12 (shown in FIGS. 1–3), using a bolt, stud, ring or other attachment mechanism.

A frangible attachment mechanism 54, shown in phantom, secures the frangible attachment region 44 of the extensible tether 30 to the inflatable cushion 40. FIG. 4 illustrates the use of frangible stitching 54 to secure the frangible attachment region 44 to the inflatable cushion 40. As explained above, other types of mechanical fasteners may be used to secure the frangible attachment region 44 to the cushion 40.

A secure attachment mechanism 56, shown in phantom, attaches the secure attachment region 46 of the extensible tether 30 to the inflatable cushion 40. FIG. 4 shows the use of secure stitching 56 to secure the secure attachment region 46 to the inflatable cushion 40. Again, other types of mechanical fasteners may be used in this instance.

Each filling duct 68 is situated within an aperture 72 in the inflatable cushion 40. The filling ducts 68 can be made from a resilient material, such as plastic. A clamp 74 is used to secure each filling duct 68 to a portion 76 of the inflatable cushion 40. Other mechanisms may be used to secure a filling duct 68 within an aperture 72, such as stitching, rivets, staples, clips, or adhesives.

A frangible seam 78 surrounds the portion 76 of the inflatable cushion 40 secured to the filling duct 68. The frangible seam 78 is designed to break when a predetermined amount of force is applied to the seam 78. The predetermined about of force required to break the frangible seam 78 should be approximately equal to the predetermined amount of force required to break the frangible attachment mechanism 54. Accordingly, in the event of an accident, following inflation of the inflatable cushion 40, the frangible attachment mechanisms 54 will break at approximately the same time that the frangible seam 78 breaks. As a consequence, the inflatable cushion 40 will thereafter be permitted to freely move to the full extent permitted by the extensible tether 30.

Figure 5:
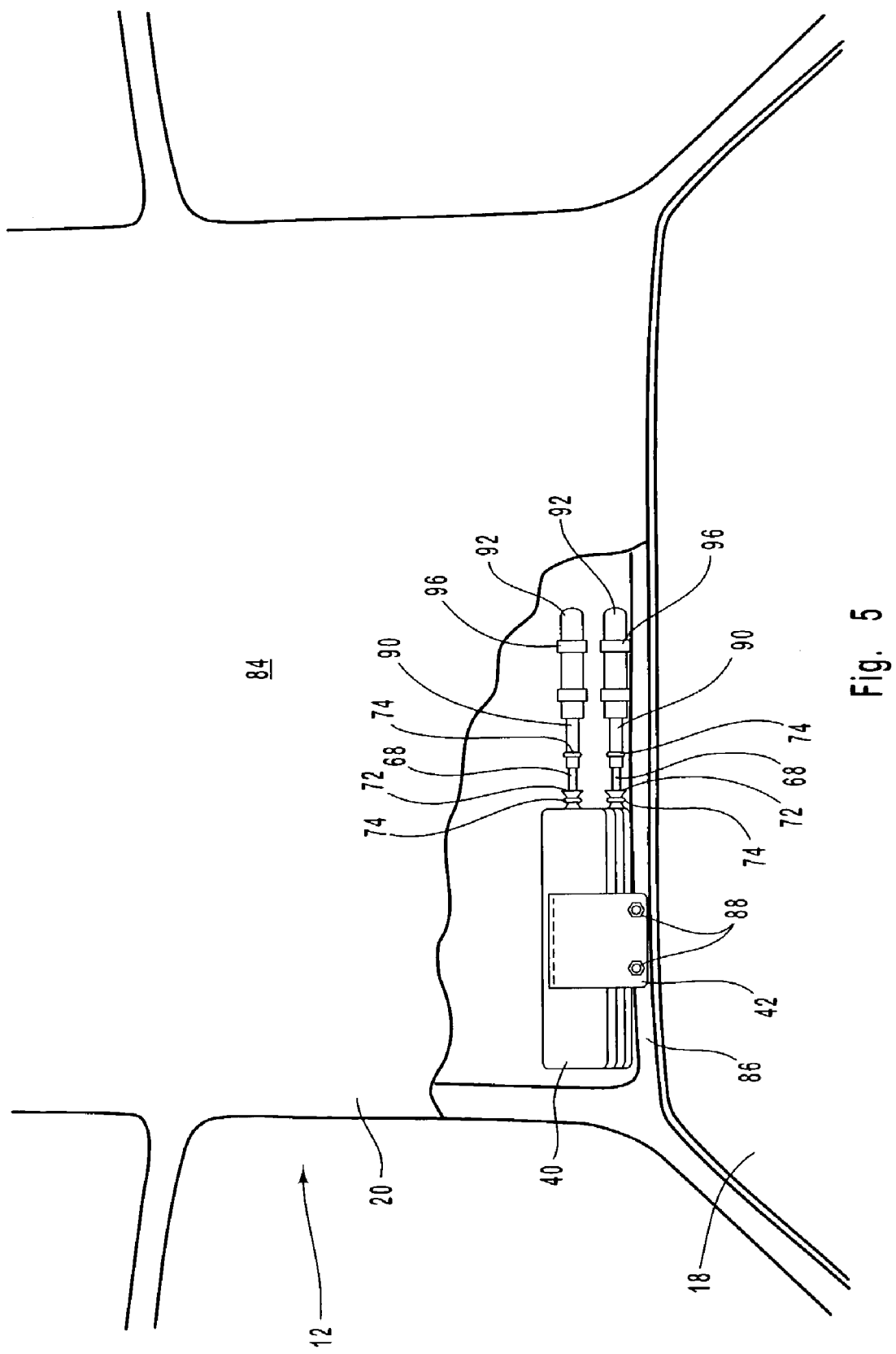
FIG. 5 is a bottom view of a tethered airbag system in a stowed position within a vehicle, a portion of the ceiling liner of the vehicle being cut away.

With reference to FIG. 5, there is shown a bottom view of a tethered airbag system 10 in a stowed position within a roof 20 of a vehicle 12. A portion of the ceiling liner 84 in the roof 20 of the vehicle 12 has been cut away. When the depicted tethered airbag system 10 is activated, the inflatable cushion 40 will deploy in a direction away from the roof 20. The inflatable cushion 40 is in a folded state. Frangible straps or an envelope (not shown) may be used to retain the inflatable cushion 40 in a folded state until it is deployed.

The vehicle attachment region 42 of the extensible tether 30 is attached to the header rail 86 of the vehicle 12 using a vehicle attachment mechanism 88, such as a bolt, rivet, or screw. The header rail 86 is adjacent to the windshield 18. Clamps 74 are used to secure the filling ducts 68 within the apertures 72 of the inflatable cushion 40. A clamp 74, or other attachment mechanism, may also be used to attach each of the filling ducts 68 to a gas guide 90 from an inflator 92. In an alternative embodiment, a filling duct 68 may attach directly to an inflator 92. Brackets 96 are used to secure each inflator 92 to the roof 20 of the vehicle 12. A control unit, which determines when accident conditions exist and sends a inflation signal to the inflators 92, is not shown in FIG. 5 for clarity.

FIG. 6 is a perspective view of an alternative embodiment of a tethered airbag system 110. In contrast to the embodiment shown in FIGS. 1–5, the present embodiment includes a first extensible tether 130, a second extensible tether 132, and a third extensible tether 134. The second extensible tether 132 is similar in shape and size to the extensible tether 30 shown in connection with FIGS. 1–5. The first extensible tether 130 and the third extensible tether 134, on the other hand, are narrower than the second extensible tether 132. The first, second, and third extensible tethers 130, 132, 134 are each attached to an inflatable cushion 140, which is similar to the inflatable cushion 40 shown in FIGS. 1–5.

The first, second, and third extensible tethers 130, 132, 134 each include a vehicle attachment region 142, a frangible attachment region 144, a secure attachment region 146, and an extensible region 148. In contrast to the extensible tether 30 shown in connection with FIGS. 1–5, the extensible tethers 130, 132, 134 are not each attached to opposing sides of the inflatable cushion 140. As illustrated, the extensible tethers 130, 132, 134 are each attached to the same side of the inflatable cushion 140. Of course, other configurations come within the scope of this invention. For instance, the first and third extensible tethers 130, 134 may be attached to one side of the inflatable cushion 140, while the second extensible tether 132 is attached to the opposite side of the cushion 140.

A frangible attachment mechanism 54, shown in phantom, attaches each of the frangible attachment regions 144 to the inflatable cushion 140. A secure attachment mechanism 56, shown in phantom, attaches each of the secure attachment regions 146 to the inflatable cushion 140. Openings 158 on each of the vehicle attachment regions 142 are used to attach each of the tethers 130, 132, 134 to a vehicle 12 (shown in FIGS. 1–3) with, for example, bolts, rivets, or the like.

An extensible region 148 is positioned between each of the depicted frangible attachment regions 144 and secure attachment regions 146. When the tethered airbag system 110 is installed in a vehicle 12 and the inflatable cushion 140 is inflated, each of the frangible attachment mechanisms 54 will break upon the application of a predetermined force, permitting the frangible attachment regions 144 and the adjacent extensible regions 148 to separate from the inflatable cushion 140. In such a condition, the inflatable cushion 140 may extend a greater distance from a roof 20 (shown in FIGS. 1–3) of a vehicle 12 to minimize the risk of neck or back injury to a protected occupant. During all stages of deployment, each secure attachment mechanism 56 securely attaches the inflatable cushion 140 to the secure attachment regions 146 of the first, second, and third extensible tethers 130, 132, 134.

The embodiment shown in FIG. 6 also includes filling ducts 168. In the embodiment shown in FIG. 4, a frangible seam 78 permitted the filling ducts 68 to separate from the inflatable cushion 40. In this embodiment, no frangible seam 78 is needed. Instead, frangible stitching 170 secures the filling duct 168 within an aperture 172 in the inflatable cushion 140. Accordingly, the filling duct 168 can be made from a flexible material, such as fabric. Alternatively, the filling duct 168 can be made from a more resilient material, such as plastic. When the inflatable cushion 140 is inflated, the portions of the inflatable cushion 140 that were previously adjacent to the filling duct 168 separate from the filling duct 168, breaking the frangible stitching 170 and permitting the filling duct 168 to separate from the inflatable cushion 140. In addition, the force of an occupant 24 striking the inflatable cushion 140 may break, or contribute to the breaking of, the frangible stitching 170.

In addition to the use of frangible stitching 170, other types of frangible attachment mechanisms may be used in connection with this invention. For instance, a frangible clamp, pin, or staple (not shown) may be used to release the filling duct 168 when a predetermined force is applied.

In the alternative to the filling duct 168 separating from the inflatable cushion 140, the filling duct 168 may separate from an attached inflator 92 or gas guide 90 (shown in FIG. 5) upon the application of a predetermined force. This may be achieved by use of, for example, a frangible clamp, frangible gas guide, or frangible connector.

As illustrated by the differences between the embodiment shown in FIGS. 1–5 and the embodiment shown in FIG. 6, the tethered airbag system may be constructed in a number of different ways within the scope of this invention. For example, the tethered airbag system may include varying numbers of extensible tethers, such as one, two, three, four, or five extensible tethers at various positions on an inflatable cushion. Likewise, the number of filling ducts is not limiting of the scope of the invention. In addition, the tethers and filling ducts may be positioned on the same or adjacent sides of the inflatable cushion. The tethered airbag system may be used to protect occupants in the backseat of a vehicle or may deploy from, for instance, the roof or door of a vehicle.

The tethered airbag system provides substantial advantages over conventional systems. The tethered airbag system deploys the inflatable cushion in a position immediately in front of a protected occupant of a vehicle. Thereafter, the frangible attachment mechanisms break to permit the inflatable cushion to shift further toward the front of the vehicle, minimizing the risk of neck or back injury to the protected occupant. Through all stages of deployment, the secure attachment mechanisms retain the inflatable cushion securely attached to the extensible tether or tethers. As such, manufacturers may more easily prove that the tethered airbag system correctly deployed. In addition, securely tethering the inflatable cushion to the vehicle helps to maintain the cushion in front of the occupant even if the vehicle is subjected to angular or lateral forces.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A tethered airbag system comprising:
   an inflatable cushion;
   an extensible tether having a frangible attachment region, an extensible region, and a secure attachment region, wherein the extensible region is positioned between the frangible attachment region and the secure attachment region;
   a frangible attachment mechanism that attaches the cushion to the frangible attachment region of the extensible tether;
   a secure attachment mechanism that attaches the cushion to the secure attachment region of the extensible tether; and
   a filling duct secured to the cushion wherein the filling duct is attached to a gas guide of an inflator and the filling duct separates from the cushion following inflation of the cushion.

2. The tethered airbag system of claim 1, wherein the extensible tether is made from fabric.

3. The tethered airbag system of claim 1, wherein the frangible attachment mechanism includes frangible stitching.

4. The tethered airbag system of claim 1, wherein the secure attachment mechanism includes secure stitching.

5. The tethered airbag system of claim 1, wherein the filling duct is secured to the cushion by frangible stitching.

6. The tethered airbag system of claim 1, wherein a frangible seam surrounds a portion of the cushion secured to the filling duct.

7. The tethered airbag system of claim 1, wherein the filling duct separates from the inflator following inflation of the cushion.

8. A tethered airbag system comprising:
   an inflatable cushion;
   an extensible tether having a vehicle attachment region, a frangible attachment region, an extensible region, and a secure attachment region, wherein the extensible region is positioned between the frangible attachment region and the secure attachment region, and wherein the frangible attachment region is positioned between the vehicle attachment region and the secure attachment region;
   a frangible attachment mechanism that attaches the cushion to the frangible attachment region of the extensible tether;

a secure attachment mechanism that attaches the cushion to the secure attachment region of the extensible tether; and a vehicle attachment mechanism that attaches the vehicle attachment region of the extensible tether to a vehicle.

9. The tethered airbag system of claim 8, wherein the extensible tether is made from fabric.

10. The tethered airbag system of claim 8, wherein the frangible attachment mechanism includes frangible stitching.

11. The tethered airbag system of claim 8, wherein the secure attachment mechanism includes secure stitching.

12. The tethered airbag system of claim 8, wherein the vehicle attachment mechanism includes a bolt positioned within an opening in the vehicle attachment region of the extensible tether.

13. The tethered airbag system of claim 8, further comprising a filling duct secured to the cushion.

14. The tethered airbag system of claim 13, wherein the filling duct is attached to a gas guide of an inflator.

15. The tethered airbag system of claim 14, wherein the filling duct separates from the cushion following inflation of the cushion.

16. The tethered airbag system of claim 15, wherein the filling duct is secured to the cushion by frangible stitching.

17. The tethered airbag system of claim 15, wherein a frangible seam surrounds a portion of the cushion secured to the filling duct.

18. The tethered airbag system of claim 14, wherein the filling duct separates from the inflator following inflation of the cushion.

19. A roof-mounted tethered airbag system comprising:
an inflatable cushion;
a filling duct secured to the cushion;
a gas guide of an inflator attached to the filling duct;
an extensible tether having a frangible attachment region, an extensible region, and a secure attachment region, wherein the extensible region is positioned between the frangible attachment region and the secure attachment region;
a frangible attachment mechanism that attaches the cushion to the frangible attachment region of the extensible tether; and
a secure attachment mechanism that attaches the cushion to the secure attachment region of the extensible tether;
wherein the extensible tether further comprises a vehicle attachment region, and wherein the frangible attachment region is positioned between the vehicle attachment region and the secure attachment region.

20. The roof-mounted tethered airbag system of claim 19, further comprising a vehicle attachment mechanism that attaches the vehicle attachment region of the extensible tether to a vehicle.

21. The roof-mounted tethered airbag system of claim 20, wherein the vehicle attachment mechanism includes a bolt positioned within an opening in the vehicle attachment region of the extensible tether.

22. The roof-mounted tethered airbag system of claim 19, wherein the extensible tether is made from fabric.

23. The roof-mounted tethered airbag system of claim 19, wherein the frangible attachment mechanism includes frangible stitching.

24. The roof-mounted tethered airbag system of claim 19, wherein the secure attachment mechanism includes secure stitching.

25. The roof-mounted tethered airbag system of claim 19, wherein the filling duct is attached to a gas guide of an inflator.

26. The roof-mounted tethered airbag system of claim 25, wherein the filling duct separates from the inflator following inflation of the cushion.

27. The roof-mounted tethered airbag system of claim 19, wherein the filling duct separates from the cushion following inflation of the cushion.

28. The roof-mounted tethered airbag system of claim 27, wherein the filling duct is secured to the cushion by frangible stitching.

29. The roof-mounted tethered airbag system of claim 27, wherein a frangible seam surrounds a portion of the cushion secured to the filling duct.

30. A roof-mounted tethered airbag system, comprising:
an inflatable cushion;
a filling duct frangibly secured to the inflatable cushion; and
a gas guide of an inflator attached to the filling duct;
wherein a frangible seam surrounds a portion of the cushion secured to the filling duct.

31. The roof-mounted tethered airbag system of claim 30, wherein the filling duct is secured to the cushion by frangible stitching.

* * * * *